(12) United States Patent
Bedard

(10) Patent No.: US 10,252,816 B2
(45) Date of Patent: Apr. 9, 2019

(54) DOWNED AIRCRAFT LOCATION SYSTEM AND METHOD

(71) Applicant: Fernand Bedard, Arlington, VA (US)

(72) Inventor: Fernand Bedard, Arlington, VA (US)

(73) Assignee: The Bedard Family Trust, Sarasota, FL (US)

( * ) Notice: Subject to any disclaimer, the term of this patent is extended or adjusted under 35 U.S.C. 154(b) by 0 days.

(21) Appl. No.: 15/709,561

(22) Filed: Sep. 20, 2017

(65) Prior Publication Data

US 2018/0079524 A1    Mar. 22, 2018

Related U.S. Application Data

(60) Provisional application No. 62/397,065, filed on Sep. 20, 2016.

(51) Int. Cl.
| | |
|---|---|
| *H01Q 7/06* | (2006.01) |
| *B64D 45/00* | (2006.01) |
| *G01S 1/68* | (2006.01) |
| *G01S 5/02* | (2010.01) |

(52) U.S. Cl.
CPC ........... *B64D 45/00* (2013.01); *G01S 1/68* (2013.01); *G01S 5/0231* (2013.01); *B64D 2045/0065* (2013.01)

(58) Field of Classification Search
None
See application file for complete search history.

(56) References Cited

U.S. PATENT DOCUMENTS

| | | | |
|---|---|---|---|
| 2,812,452 A | 5/1956 | Harris | |
| 5,243,430 A | 9/1993 | Emmons | |
| 5,457,641 A | 10/1995 | Zimmer et al. | |
| 6,538,616 B1 | 3/2003 | Bedard | |
| 6,960,929 B2 | 11/2005 | Bedard | |
| 7,459,927 B2 | 12/2008 | Bedard | |
| 9,738,398 B1 * | 8/2017 | Wang | B64D 45/00 |
| 2009/0195085 A1 | 8/2009 | Joseph | |
| 2011/0215808 A1 * | 9/2011 | Cholayil | G01V 3/08 |
| | | | 324/326 |
| 2012/0007787 A1 * | 1/2012 | Schantz | G01S 5/14 |
| | | | 343/788 |
| 2012/0113575 A1 * | 5/2012 | Uy | G01D 11/24 |
| | | | 361/679.01 |
| 2012/0223856 A1 | 9/2012 | Sontag | |
| 2013/0099975 A1 * | 4/2013 | Cyganski | G01S 5/0205 |
| | | | 342/432 |
| 2013/0316753 A1 * | 11/2013 | Van Dijk | A01K 11/006 |
| | | | 455/517 |
| 2014/0020797 A1 | 1/2014 | Brady et al. | |

FOREIGN PATENT DOCUMENTS

CN    2695916 Y    4/2005

OTHER PUBLICATIONS

International Search Report and Written Opinion for PCT Patent App. No. PCT/US17/52374 dated Nov. 21, 2017.

\* cited by examiner

*Primary Examiner* — Brent Swarthout
(74) *Attorney, Agent, or Firm* — Cermak Nakajima & McGowan LLP; Adam J. Cermak

(57) ABSTRACT

An EM emitter includes at least three orthogonal coils driven by an oscillating voltage source, with the coils being electrically in parallel or series. When used in a vehicle, particularly an airplane, and the vehicle is lost, e.g., sinks, the emitter's EM signal passes through water with little attenuation and can be detected and the vehicle located.

5 Claims, 3 Drawing Sheets

DOWNED AIRCRAFT LOCATION SYSTEM AND METHOD

This application claims priority under 35 U.S.C. § 119 to U.S. provisional application No. 62/397,065, filed on 20 Sep. 2016 by the inventor hereof, the entirety of which is incorporated by reference herein.

BACKGROUND

Field of Endeavor

The present invention relates to devices, systems, and processes useful for the location of missing vehicles, and more specifically to the location of downed aircraft.

Brief Description of the Related Art

At the time of the "TWIN TOWERS" disaster, the so-called "BLACK BOX" of the aircraft were desperately sought. The standard "finder" is an acoustic emitter that is located in the aircraft. Since the BLACK BOX was most likely buried in the rubble of the towers, the sound was not able to exit and be detected.

There remains a need for a more effective system for the location of the Black Box, and more generally to vehicles, particularly aircraft.

SUMMARY

According to a first aspect of the invention, an emitter comprises three orthogonal coils, and an oscillating voltage source connecting the coils in parallel or in series.

The emitter can include an enclosure, wherein the coils and the oscillating voltage source are contained in said enclosure.

In such an emitter the coils and the oscillating voltage source together generate an omnidirectional EM signal at a frequency, and the enclosure is at least semi-transparent to said EM signal.

The emitter can further include an incompressible potting material filling said enclosure, wherein the coils and the oscillating voltage source together generate an omnidirectional EM signal at a frequency, and wherein the potting material is at least semi-transparent to said EM signal.

In such an emitter, the coils and the oscillating voltage source together generate a magnetic field of at least 3.5× 10-15 Tesla at 1000 feet.

In such an emitter, the oscillating voltage source oscillates at a frequency below 1000 hz.

In such an emitter, the oscillating voltage source oscillates at a frequency between 30-200 hz.

According to another aspect, a locatable vehicle comprises a vehicle, and an emitter as indicated, in said vehicle.

In such a vehicle, the vehicle is an airplane.

According to another aspect, a process of locating a vehicle comprises positioning an emitter as indicated, in said vehicle, and sensing an electromagnetic signal originating from said emitter.

In such a process, the vehicle is an airplane.

According to yet another aspect, a process of locating a person comprises positioning an emitter as indicated with said person, and sensing an electromagnetic signal originating from said emitter.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which FIG. 1 diagrammatically illustrates an exemplary device including a device in accordance with the principles of this disclosure.

DETAILED DESCRIPTION OF EXEMPLARY EMBODIMENTS

Figure 1:
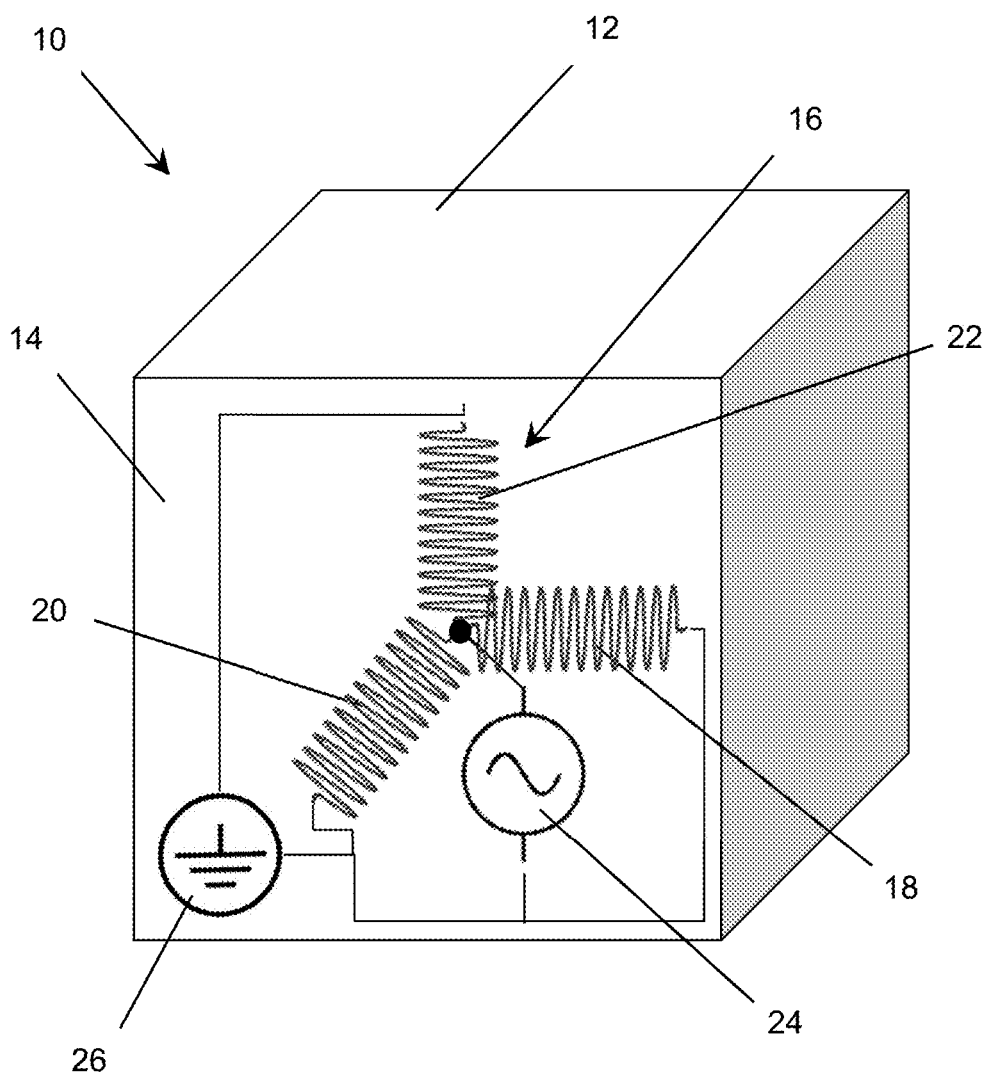

Referring to the drawing figures, like reference numerals designate identical or corresponding elements throughout the several figures.

The singular forms "a," "an," and "the" include plural referents unless the context clearly dictates otherwise. Thus, for example, reference to "a solvent" includes reference to one or more of such solvents, and reference to "the dispersant" includes reference to one or more of such dispersants.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a range of 1 to 5 should be interpreted to include not only the explicitly recited limits of 1 and 5, but also to include individual values such as 2, 2.7, 3.6, 4.2, and sub-ranges such as 1-2.5, 1.8-3.2, 2.6-4.9, etc. This interpretation should apply regardless of the breadth of the range or the characteristic being described, and also applies to open-ended ranges reciting only one end point, such as "greater than 25," or "less than 10."

In general terms, systems and processes of this application replace the acoustic emitter of the current "Black Box" with a magnetic field generator.

Figure 2A:
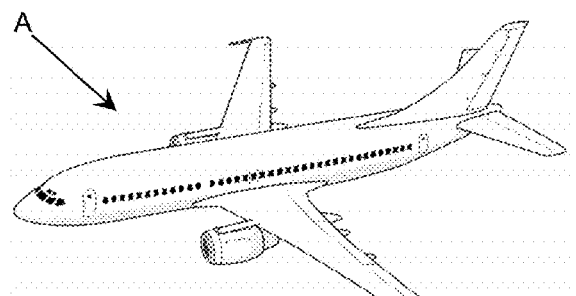
FIGS. 2A-2D illustrate exemplary vehicles usable with the device of FIG. 1.
Figure 2B:
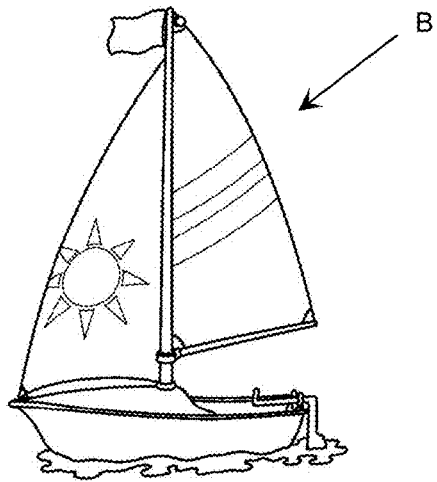
Figure 2C:
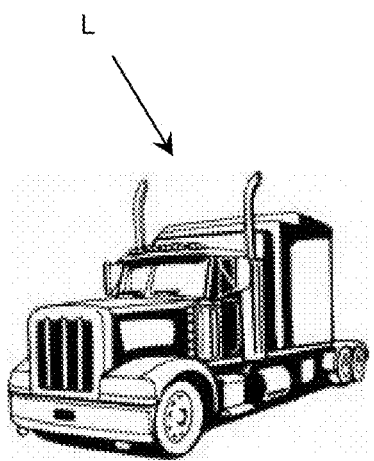
Figure 2D:
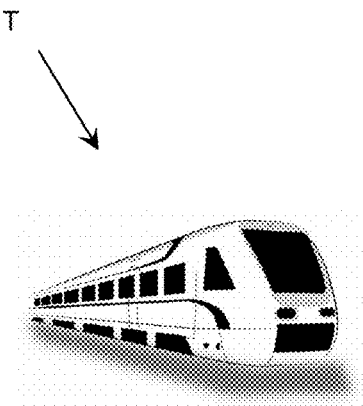

According to an exemplary embodiment, and with reference to FIG. 1, an enclosure, which may be a four-inch cube box, includes a magnetic field generator which emits a sufficiently strong field to be "heard", that is, the magnetic field from which is detected, at kilometer distances. Additionally, since the system operates as a low frequency emitter, it works very well underwater. Accordingly, another aspect of this application is the use of these systems in and for locating downed aircraft A (FIG. 2A), on watercraft/ boats B (FIG. 2B), but also can be used with missing land vehicles L (FIG. 2C), including trains T (FIG. 2D).

With reference to the exemplary embodiment illustrated in FIG. 1, a magnetic field generator system 10 includes an enclosure 12 that is potted or otherwise filled with a material 14 that will resist compression and the intrusion of water at the great depths described herein, in much the same way that current "Black Boxes" are constructed. While the embodiment of FIG. 1 illustrates a cube, any shape of enclosure can be used, including spheres.

Inside the enclosure 12, the system 10 includes a magnetic field generator 16. The generator 16 includes coils 18, 20, 22 which are physically oriented orthogonal to each other, thus defining X, Y, and Z directions. The coils are advantageously identical, so that the electromagnetic (EM) field generated by each is identical, which balances the generator while permitting the system to transmit signals in all directions. The coils are electrically in parallel between an oscillating voltage source 24 and ground 26. The power and frequency of the source 24 is selected with the inductance of each of the coils (and with the inherent resistance of the wire connecting the coils to ground 26) in a manner well understood by those of ordinary skill in the art, to generate an oscillating EM field through and around each coil, which is thus an EM signal that will propagate through the potting material 14 and the material of enclosure 12 and be detectable at great distances.

Exemplary Implementation 4 inch aluminum cube, potted with epoxy
Coils: three (3) orthogonal windings
200 turns per winding
0.02 inch copper diameter wire forms coils
Resistance of wire=6.9 ohms
Coils driven in parallel by lithium cell(s)
Voltage: 3.6v
Current: 0.8 amperes
Coil Inductance: 0.00395 Hy (henries) per axis
Magnetic field at 1000 feet=$3.5\times10^{-15}$ Tesla (at least)

The frequency generated by the emitter is selected to be low enough that its signal is not severely attenuated by water, so that location of the device in deep water can be performed. Frequencies below 1000 hz are thus particularly useful, especially those between about 30-200 hz. Additionally, the coils are positioned orthogonal to each other and held in that orientation, either by suitable supports attached to the enclosure (not illustrated), or by the potting material, or by both.

As those of ordinary skill in the art will immediately appreciate, the oscillating voltage source can be constructed of numerous existing devices which are commonly commercially available. By way of example only, the exemplary embodiment 24 includes the aforementioned lithium cell(s) as a voltage source, with a suitable oscillator, optionally including a clock circuit, which will oscillate the voltage at the desired frequency, which together function as the oscillator described herein, as well known by those of ordinary skill in the art.

For forming the structure of the enclosure itself, any material which is effectively at least semi-transparent, advantageously transparent, to the frequency(ies) of the EM radiation created by the emitter can be used, of which aluminum is useful for frequencies below 1000 hz; other materials, such as polymers, ceramics, other metals, and the like, can also be used, so long as they have the physical characteristics to form an enclosure and contain the potting material (which is also at least semi-transparent, advantageously transparent, to the frequency(ies) of the EM radiation created by the emitter) and the emitter, and be sufficiently EM transparent.

Systems as described herein can produce an omnidirectional EM signal which can be effective in debris or underwater at a range greater than 1 kilometer, and can operate 50 days or longer. Detection of the emitter's signal can be performed with numerous systems; however, the CUBE system, which is currently used and available from Sensorcom Inc. (Annapolis, Md.), and is described in U.S. Pat. No. 6,538,616 (incorporated by reference in its entirely herein), by the inventor hereof, are particularly advantageous.

As those of ordinary skill in the art readily appreciate, the several subcomponents can be modified while still forming part of this disclosure. By way of non-limiting example: the oscillating voltage source can be satisfied by many known such sources, including those of different voltage and current; the conductors connecting the coils to the voltage source can be designed in any known manner; the coils can be formed differently and/or can have a different electrical inductance, so long as they are all the same; the size of the enclosure can be selected for any convenient implementation, although an enclosure which protects the emitter itself while being sufficiently transparent to the emitter's signal, is highly preferable.

Figure 3:
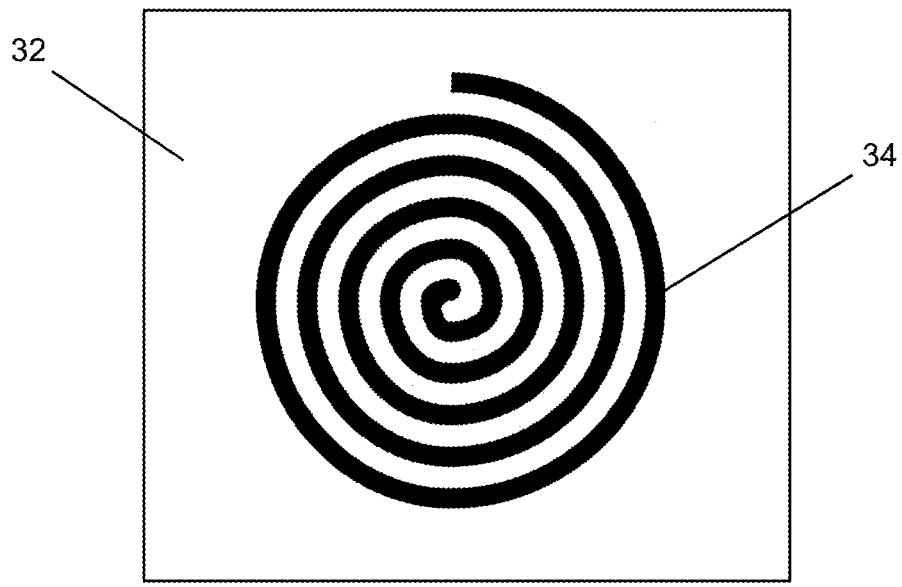
FIG. 3 illustrates a portion of a second exemplary embodiment.
Figure 4:
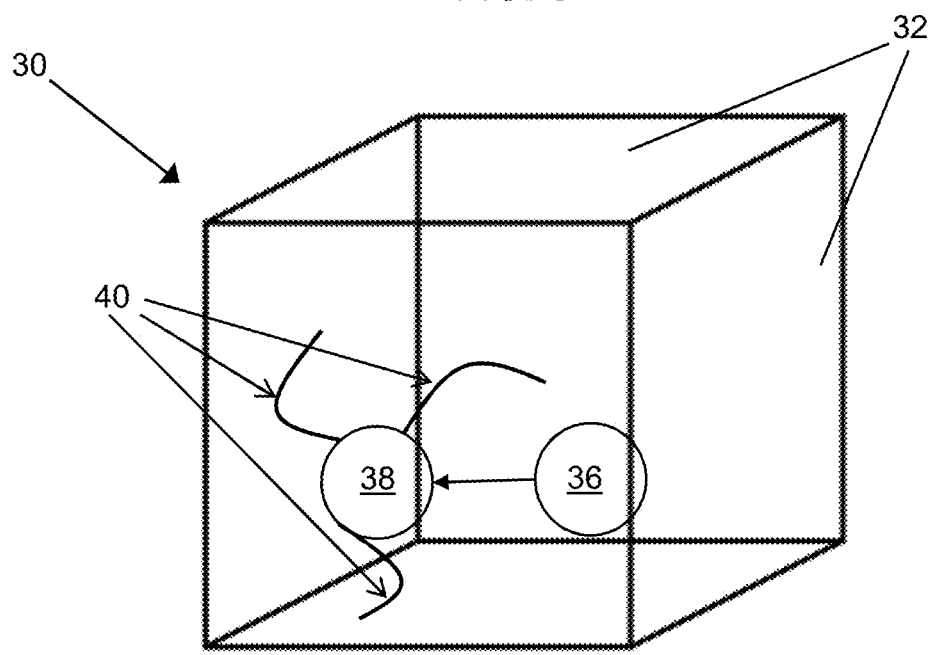
FIG. 4 illustrates the second exemplary embodiment.

FIGS. 3 and 4 illustrate another exemplary embodiment of an emitter 30. The emitter 30 is a cube created using printed circuit boards 32. Among others, emitter 30 is advantageous because it is inexpensive and easy to manufacture. Each circuit board 32 is patterned appropriately with the coil 34, as suggested in FIG. 3. As illustrated in FIG. 4, at least three (3), and preferably six (6) printed circuit boards 32, form or are on the surface of a cube.

FIG. 4 illustrates a cubic emitter 30, in which each of the six sides is a printed circuit board 32, or is a plate with a printed circuit board 32 mounted on it. On each of the printed circuit boards 32, a spiral or coil 34 is formed, e.g., etched into the material (e.g., copper). When etched, the etching can be done on either surface of the board, or on both surfaces. By way of a non-limiting example, the spiral/coil 34 could be etched clockwise on each of the, e.g., six boards. According to yet another exemplary embodiment, an emitter is a hybrid of the emitters 10, 30, with some of the coils formed as printed circuit boards and some being traditional coils.

Inside the cube of the emitter 30 is provided a DC power supply 36, which feeds an AC generator 38 for converting DC current to AC current at the chosen frequency, as described elsewhere herein. The emitter 30 also contains at least two (or more) leads 40 (only three are illustrated) which then feed the windings on each board to generate the EM field. Thus, the interior subcomponents of the embodiment illustrated in FIG. 4 are the same as those of FIG. 1, except that of FIG. 4 does not contain the field generator 16, instead forming or including some of those components as, or mounted to, the walls of the cube. Similarly, the cube of the embodiment of FIG. 4 can be potted with an at least EM-semi-transparent material. In any of the emitters described herein, the potting material can be omitted, e.g., to save weight.

According to yet another embodiment, emitter devices as described herein can also be used to detect a person's location. By way of non-limiting example, a miner can carry with them an emitter device as described herein, in the case of a cave-in (for example, in a coal mine); alternatively, a hiker, including a soldier, can carry with them an emitter device as described herein. In all cases, if the person cannot be located by other methods, the emitter device's signal can be used to locate them as described herein.

In yet another alternative embodiment, the coils described herein are electrically connected and driven series, rather than in parallel.

In yet another embodiment, the coils described herein are not all the same size, but rather are different sizes, where the size is compensated for by the EM current.

According to yet another embodiment, other vehicles and objects can be provided with an emitter device as described herein, including underwater vessels such as a towed buoy and a submarine.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

I claim:

1. An emitter comprising:

six orthogonal coils;

six printed circuit boards forming a cube, wherein each of said six orthogonal coils is formed as a spiral on one printed circuit board;

an incompressible potting material filling said cube;

a DC power source within said cube;

an oscillating voltage source within said cube connecting the coils in parallel, and the oscillating voltage source being connected to said DC power source;

wherein said oscillating voltage source oscillates at a frequency between 30-200 hz;

wherein the coils and the oscillating voltage source together generate an omnidirectional EM signal at a frequency; and wherein the potting material is at least semi-transparent to said EM signal.

2. An emitter according to claim 1, wherein:

the cube is at least semi-transparent to said EM signal.

3. An emitter according to claim 1, wherein said coils and said oscillating voltage source together generate a magnetic field of at least 3.5×10-15 Tesla at 1000 feet.

4. A locatable vehicle comprising:

an airplane or a boat; and an emitter according to claim 1, in said airplane or said boat.

5. A process of locating an airplane or a boat submerged in seawater, the process comprising:

positioning an emitter according to claim 1 in said airplane or said boat prior to said airplane or said boat being submerged; and sensing an electromagnetic signal originating from said emitter when said airplane or said boat is submerged.

* * * * *